Feb. 21, 1950  J. L. STAVER  2,498,611
HAY HOIST
Filed May 11, 1946  2 Sheets-Sheet 1

INVENTOR.
Joseph L. Staver
BY
Moore Olson & Trexler
attys.

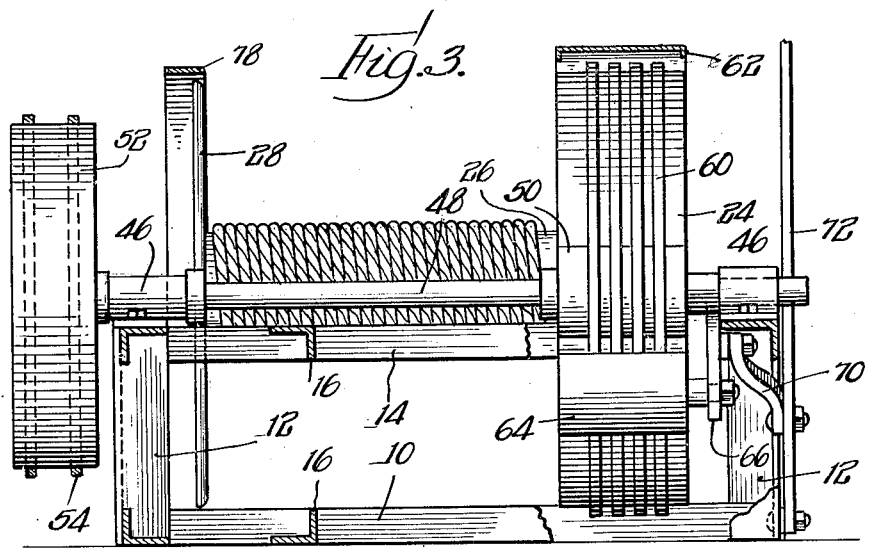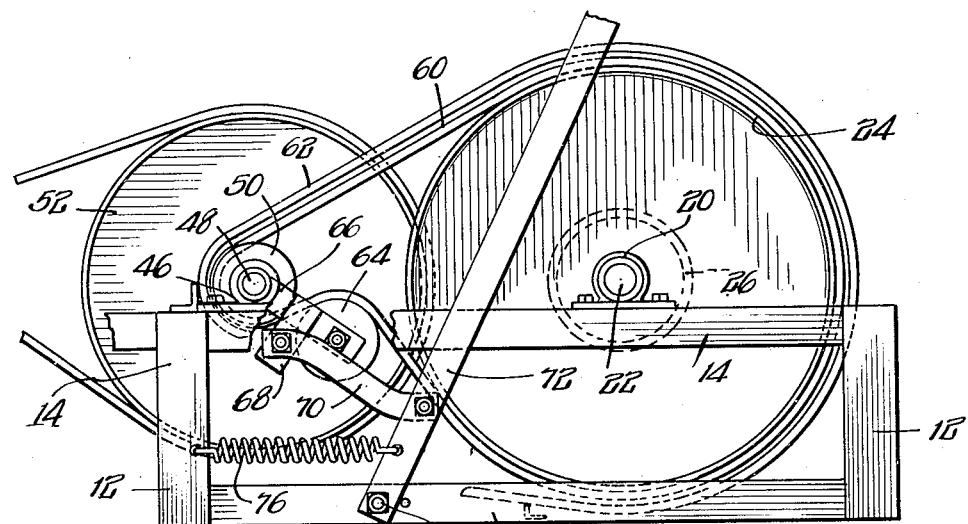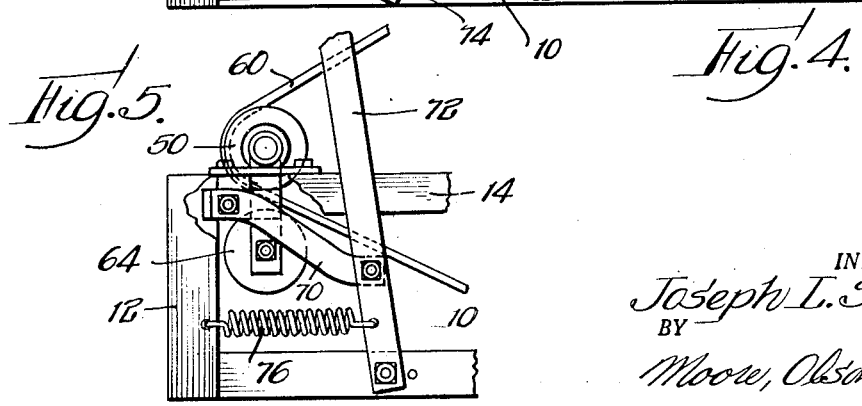

Patented Feb. 21, 1950

2,498,611

UNITED STATES PATENT OFFICE 2,498,611

HAY HOIST

Joseph L. Staver, Mineral Point, Wis.

Application May 11, 1946, Serial No. 669,034

3 Claims. (Cl. 254—187)

The present invention relates to hoists and more particularly to a hoist suitable for use with a hay rack and the like.

Heretofore a common method of elevating loaded hay forks into the lofts of barns was with a block and tackle arrangement pulled by horses. This way required several people to manipulate the apparatus and the horses. The horses would have to be driven to pull the load of hay into the barn and then the horses would have to be returned back to their original starting place. This method is still in wide use, but other methods have been suggested such as using a power source for this purpose such as may be obtained from a gasoline motor or an electric motor. The employment of a source of power of this kind in many instances, however, has involved rather complicated and expensive apparatus so that it would be highly desirable to provide an efficient, economical means for this purpose.

It is therefore an object of the present invention to provide a power driven hoist suitable for use with a hay fork or the like which is relatively simple and economical to manufacture.

It is a further object of the present invention to provide in a power driven hoist a relatively simple arrangement for disconnecting the source of power and for releasing the hoisting drum so that the hay fork may be returned manually to the starting point.

A further object of the present invention is to provide in a motor driven hoisting apparatus an arrangement whereby a belt drive may be quickly disconnected and moved out of contact with the pulley of the winding drum.

Still another object of the present invention is to provide in a motor driven hoist an apparatus having a belt driving arrangement whereby the belt drive is normally disconnected, and power is applied only in response to manual actuation of a power applying mechanism.

Other and further objects of the present invention subsequently will become apparent by reference to the following description taken in conjunction with the accompanying drawings which form a part of this application in which Figure 1 is a plan view partially in cross section showing the present invention;

Figure 3 is a right end view of the apparatus shown in Figure 1;

Figure 4 is a rear view of the apparatus of Figure 1; and

Figure 5 is a partial view similar to Figure 4 illustrating a different condition of operation.

Figure 1:
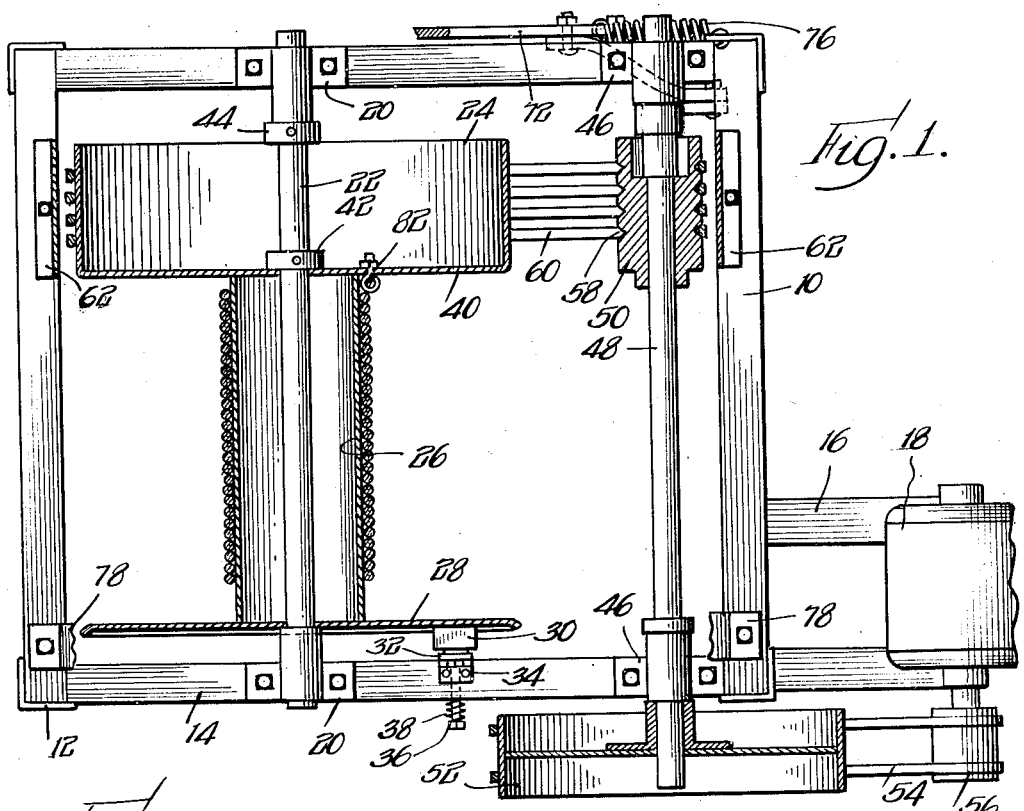
Figure 2:
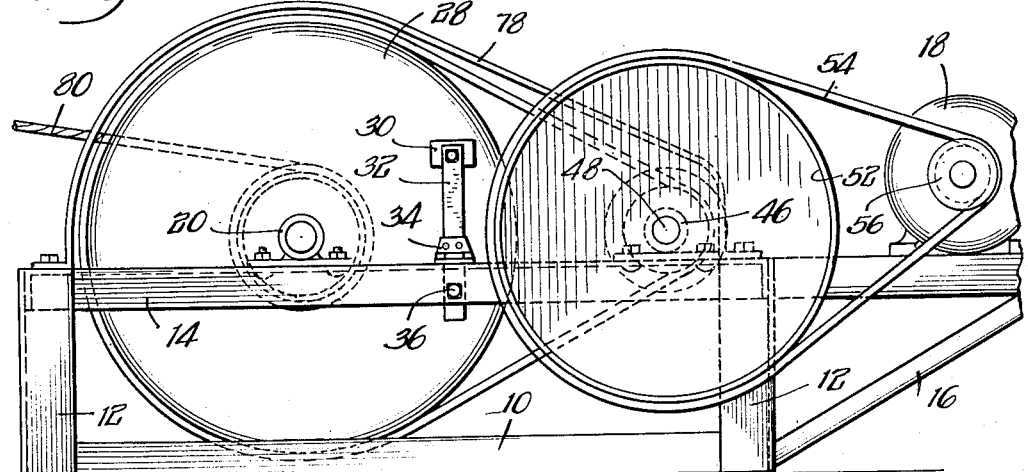
Figure 2 is a front view of the apparatus shown in Figure 1.

The present invention as illustrated in the drawings is provided with a frame 10 of generally quadrangular base configuration having four upright members 12 which support the top quadrangular members 14. The main frame 10 adjacent one side is provided with an auxiliary frame 16 for supporting an electric motor 18.

The top members 14 of the main frame are provided with a pair of bearing members 20 which carry a shaft 22 upon which is mounted a driven drum 24. Adjacent the drum 24 there is mounted on the shaft a winding or winch drum 26 which at one end has a circular plate 28. The circular plate 28 is engaged by a drag brake or impositive holding device 30 which is resiliently biased toward the circular disc 28. The drag brake or impositive holding device 30 is mounted on an arm 32 which is connected to a hinge 34. The hinge 34 is secured to the upper frame portion 14. The arm 32 extends below the hinge 34 and carries a rod or bolt 36 which passes through the frame 14. The bolt 36 is surrounded by a spring 38 interposed between the head of the bolt and the frame 14 so that the upper extremity of the lever 32 is biased toward the brake disc 28.

From the construction illustrated in Figure 1, it will be noted that the pulley 24 has an end surface 40 and that the winding drum 26 extends between the members 28 and 40 whereby these latter members serve as limiting surfaces for the accumulation of the cable or rope upon the winch drum 26. It will readily be appreciated that this type of construction lends itself to fabrication from sheet metal. The members 24, 26 and 28, therefore, may be integrally interconnected together and secured in driving relation to the shaft 22 by a collar 42. The shaft 22 may also be provided with a stop collar 44 adjacent the rear bearing 20 to preclude end play of the shaft.

The frame 14 carries a plurality of bearing or journal members 46 for supporting a shaft 48. Mounted on the shaft 48 is a driving pulley 50 and a driven pulley 52. The driven pulley 52 is arranged to be driven by a plurality of belts 54 which engage the driving pulley 56 of the electric motor 18. A driving pulley 50 preferably is provided with a plurality of V grooves 58 for engagement by a plurality of V belts 60.

A substantial portion of the pulleys 24 and 50 are surrounded by a guard 62 which is spaced a relatively short distance away from the belts 60. The guard 62 is adapted to be engaged by the belts 60 when the pulley 24 is not being driven. Thus, it will be seen that the guard 62 extends from the frame 14 around a portion of the driving belts 60 and around at least two-thirds of the pulley 24.

In order to bring the belts 60 into driving relation with the pulley 24, there is provided an idler pulley 64 which is mounted on a pivoted lever 66. In the arrangement shown, it has been found convenient to pivotally mount the lever 66 from the shaft 48 beneath the belts 60. The lever 66 has an intermediate point which is provided with an extension piece 68 which is pivotally engaged by a connecting lever 70. The connecting lever 70 is connected to an intermediate point on the manually operable lever arm 72 which is pivotally journalled to the base 10 at the pivotal connection 74. The manually operable lever 72 is spring biased in one direction by a suitable spring 76 which serves to tend to move the idler 64 out of engagement with the plurality of belts 60, and by mounting the idler pulley 64 in the manner shown, gravitational force complements this tendency. When the lever 72 is not being moved toward or held in a position substantially that shown in Figure 4, the spring 76 moves the lever 72 to substantially the position shown in Figure 5, from which it will be seen that the idler roller 64 is no longer in engagement with the belts 60. When this condition has been obtained as is illustrated in Figure 5, the idler pulley 64 is no longer in contact with the V belts 60. The V belts 60 are not in driving relation with respect to the large pulley 64, but are forced outwardly to a position adjacent to the guard 62. The winding drum 26 connected to the pulley 24 therefore is in a condition whereby it may be moved manually against the action of the impositive holding device 30. The drum is turned manually whenever the hay fork has been tripped and it is desired to return the hay fork back to the source or load of hay.

From the foregoing, it will become apparent that the motor 18 may be energized so as to produce rotation of the pulley 52 and the shaft 48. This will produce rotation of the driving pulley 50, but no rotation of the winding drum 26 occurs until the manually operable lever 72 is moved from the position shown in Figure 5 to that shown in Figure 4. It may be assumed that this action has occurred so that the belts 60 now supply a driving force to the pulley 24 with the result that the winding drum 26 winds in the rope or cable. This operation continues until the hay fork has reached the proper location in the hay loft of the barn. When this location is reached, a trip rope connected to the hay fork is actuated and at the same time the lever 72 is released. The hay fork having been tripped, may then be returned back to the exterior of the barn and down onto the source of hay. When a new load of hay has been engaged by the fork, the lever 72 may be actuated to the position shown in Figure 4 whereupon another cycle of operation will occur.

In order to return the hay fork from its tripped position back to the hay rack or source of hay for another load, the drum 26 must be relatively free to rotate without over-running. In order to prevent over-running of the drum 26, the drag brake or holding device 30 has been provided.

If desired, the outer flange 28 of the winding drum 26 may also be protected by a suitable guard 78. The cable or rope 80 may be fastened to the winding drum by a simple clamping device 82 which may be in the form of a hook mounted in a suitable aperture in the pulley wall 40.

From the foregoing, it will be seen that there has been provided a relatively simple power transmission and control means serving as a hoist particularly suited for use with hay forks and the like. The entire arrangement can readily be fabricated in an economical manner since no expensive gears, clutches or the like are employed. The operation of the device is simple and lends itself to the efficient and rapid operation of a hay fork for loading hay in the loft of a barn.

While for the purpose of illustrating and describing the present invention, the drawings have shown a preferred embodiment, it is to be understood that the invention is not to be limited thereby since such modifications and variations in the components employed and in their arrangement are contemplated as may be commensurate with the spirit and scope of the invention set forth in the following claims.

The invention is hereby claimed as follows:

1. A hoist comprising a winch drum having a driven pulley and a drag brake, said drag brake being in continuous engagement with said winch drum, a driving pulley mounted on a shaft, a belt interconnecting said pulleys, an idler pulley mounted on the shaft of said driving pulley and beneath said belt by a pivoted lever, spring means biasing said idler pulley away from said belt, a guard extending around a substantial part of said pulleys and said belt, and a manually operable lever pivotally connected to said pivoted lever for moving said idler pulley against said belt to cause said belt to transmit power between said pulleys.

2. A hoist for hay racks or the like comprising a winch drum having a large driven pulley and an impositive holding device in continuous engagement with said drum, a small driving pulley, a plurality of belts interconnecting said pulleys, an idler pulley mounted on a pivoted lever having its pivotal axis coincident with the axis of said driving pulley, spring means biasing said idler pulley away from said belts, a belt guard extending around a substantial part of said pulleys and said belt, and a manually operable lever connected to said pivoted lever for moving said idler pulley against said belt to cause said belt to transmit power between said pulleys.

3. A hoist for hay racks or the like comprising a winding drum having a driven pulley, a drag brake for said drum, a driving pulley mounted on a shaft, a belt interconnecting said pulleys, an idler pulley for said belt rotatably mounted on a lever which is pivotally mounted adjacent one end of the shaft for said driving pulley, spring biasing means for urging said idler pulley away from said belt, a support and guard for said belt surrounding the major portion of said pulleys to support said belt when said idler pulley is not in engagement therewith, and manually operable lever means for shifting said idler pulley into engagement with said belt.

JOSEPH L. STAVER.

REFERENCES CITED

The following references are of record in the file of this patent:

UNITED STATES PATENTS

| Number | Name | Date |
|---|---|---|
| 247,075 | Larzelere | Sept. 13, 1881 |
| 492,872 | Maybach | Mar. 7, 1893 |
| 886,287 | Davis | Apr. 28, 1908 |
| 1,383,069 | Boyer et al. | June 28, 1921 |
| 1,489,219 | Kline | Apr. 1, 1924 |